(12) United States Patent
Min

(10) Patent No.: US 11,877,559 B1
(45) Date of Patent: Jan. 23, 2024

(54) FOLDABLE SUCTION CUP-TYPE PET HAMMOCK

(71) Applicant: Shanghai Boree E-commerce LLC, Shanghai (CN)

(72) Inventor: Yi Min, Shanghai (CN)

(73) Assignee: Shanghai Boree E-commerce LLC

( * ) Notice: Subject to any disclaimer, the term of this patent is extended or adjusted under 35 U.S.C. 154(b) by 0 days.

(21) Appl. No.: 18/204,947

(22) Filed: Jun. 2, 2023

(51) Int. Cl.
  *A01K 1/03* (2006.01)
  *A01K 1/035* (2006.01)
  *F16B 47/00* (2006.01)

(52) U.S. Cl.
  CPC .............. *A01K 1/035* (2013.01); *F16B 47/00* (2013.01)

(58) Field of Classification Search
  CPC .... A01K 1/033; A01K 15/025; A01K 1/0353; A01K 1/03; A01K 1/035
  See application file for complete search history.

(56) References Cited

U.S. PATENT DOCUMENTS

| | | | | |
|---|---|---|---|---|
| 1,912,514 A * | 6/1933 | Curtis | ..................... | B60R 7/043 5/118 |
| 2,001,364 A * | 5/1935 | Larsson | ................... | A47B 5/04 108/134 |
| 2,441,037 A * | 5/1948 | Sherrin | .................. | G01G 19/44 177/144 |
| 2,499,103 A * | 2/1950 | Love | ..................... | A01K 1/0272 224/547 |
| 3,433,443 A * | 3/1969 | Beeson | .................. | A47B 43/00 248/214 |
| 5,123,377 A * | 6/1992 | Edwards | .............. | A01K 1/0272 119/28.5 |
| 5,161,484 A * | 11/1992 | Duane | .................... | A01K 1/035 5/426 |
| 5,794,385 A * | 8/1998 | Donovan | ............... | A01K 1/035 49/70 |
| 6,397,778 B1 * | 6/2002 | Tripp | .................... | A01K 1/0353 D30/118 |
| 6,564,750 B1 * | 5/2003 | Collins | ................ | A01K 1/0353 297/254 |
| 8,607,995 B1 * | 12/2013 | Mladinich | .......... | A47G 29/1223 211/104 |
| 9,924,697 B1 * | 3/2018 | Koskey, Jr. | ............... | E06B 7/28 |
| 2005/0258117 A1 * | 11/2005 | Drake | .................. | A47B 57/045 211/106 |
| 2009/0045155 A1 * | 2/2009 | Howard | ................ | A47B 96/00 211/186 |
| 2016/0081299 A1 * | 3/2016 | Wesley | .................. | A01K 1/035 119/452 |
| 2018/0064061 A1 * | 3/2018 | Koskey, Jr. | ............... | E06B 7/28 |

(Continued)

*Primary Examiner* — Monica L Perry

(74) *Attorney, Agent, or Firm* — Jose Cherson Weissbrot

(57) ABSTRACT

The present invention discloses a foldable suction cup-type pet hammock, which comprises at least one fixed component and a bedstead, wherein the back of the fixed component is provided with at least one suction cup; the bedstead is rotatably connected with the fixed component and comprises at least one L-shaped pipe; the bedstead has a first position and a second position relative to the fixed component; the fixed component is provided with a limiting component to keep the bedstead in the first position or the second position; and a mattress with a thickness is also arranged on the bedstead, and when a pet hammock is in the folded or unfolded state, the mattress has a relatively flat surface.

7 Claims, 9 Drawing Sheets

(56) References Cited

U.S. PATENT DOCUMENTS

| | | | |
|---|---|---|---|
| 2018/0249674 A1* | 9/2018 | Koskey, Jr. | D03D 1/0017 |
| 2019/0274278 A1* | 9/2019 | Randhava | F16B 2/005 |
| 2019/0297838 A1* | 10/2019 | Simmons | A01K 1/035 |
| 2022/0104454 A1* | 4/2022 | Golub | E06B 7/32 |

* cited by examiner

FOLDABLE SUCTION CUP-TYPE PET HAMMOCK

TECHNICAL FIELD

The present invention relates to the technical field of pet hammocks, in particular to a foldable suction cup-type pet hammock.

BACKGROUND

Pet hammocks can provide a comfortable sleeping environment for pets, and are usually fixed by the window. Pets can rest in the hammock in a relaxed and comfortable posture, while enjoying the sunshine and enjoying the scenery outside the window. Therefore, pet hammocks are more and more used by pet owners.

However, the traditional pet hammock usually adopts the hanging wire structure, and one end of the bed is fixedly connected with the wall or window, and the other end is fixed by hanging wire, so that the bed is vertical to the wall or window, and at this time, the hanging wire and the bed form a 45-degree angle. Although this solution can effectively support the pet to rest in the hammock, the hammock of this solution cannot be folded, and it will occupy a large space when curtains need to be drawn, which affects the use effect of curtains.

In the prior art, there are also pet hammocks with foldable structures. In this solution, a connector is arranged at one end of the bed body, which is fixed with a wall or a window, and at the same time, the bed body is hinged with the connector, so that it can be folded relative to the wall or the window. However, the hammock in this solution is only provided with a single-layer mesh cloth, which enables the hammock to form a platform for supporting pets, but the single-layer mesh cloth is obviously insufficient for supporting pets. The actual comfort of a pet hammock on a mesh cloth is very limited, and the foldable structure adopted in the prior art cannot make the pet hammock form a bed with sufficient thickness and softness.

Based on the above problems, it is necessary to put forward a brand-new pet hammock, which has a comfortable and soft bed body, and pets can rest in a relaxed and comfortable posture on the hammock. At the same time, the hammock also has a foldable structure, which will not compress the bed body when folding, thus reducing the softness and fatigue of the bed body and effectively reducing the space occupied by the pet hammock when idle.

SUMMARY

The present invention provides a foldable suction cup-type pet hammock, which includes at least one fixed component and a bedstead, wherein the back of the fixed component is provided with at least one suction cup; the bedstead is rotatably connected with the fixed component and comprises at least one L-shaped pipe; the bedstead has a first position and a second position relative to the fixed component; the fixed component is provided with a limiting component to keep the bedstead in the first position or the second position; and a mattress with a thickness is also arranged on the bedstead, and when a pet hammock is in the folded or unfolded state, the mattress has a relatively flat surface.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the figures:
200, Fixed component; 201, Threaded hole; 210, Suction cup; 220, Limiting component; 221, Hinge part; 222, Limiting part; 223, Supporting part; 224, Limiting opening; 300, Bedstead; 310, L-shaped pipe; 311, Hinge hole; 320, Mattress; 321, Cloth ring; 322, Connecting ear; 330, Connecting pipe.

DESCRIPTION OF EMBODIMENTS

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description, rather than indicating or implying that the referred device or element must have a specific orientation, be constructed and operate in a specific orientation, and therefore should not be construed as limiting the present disclosure. The positional relationship of the constituent elements may be appropriately changed according to the direction of the described constituent elements. Therefore, it is not limited to the words and expressions described in the specification, and can be replaced appropriately according to the situation.

Figure 1:
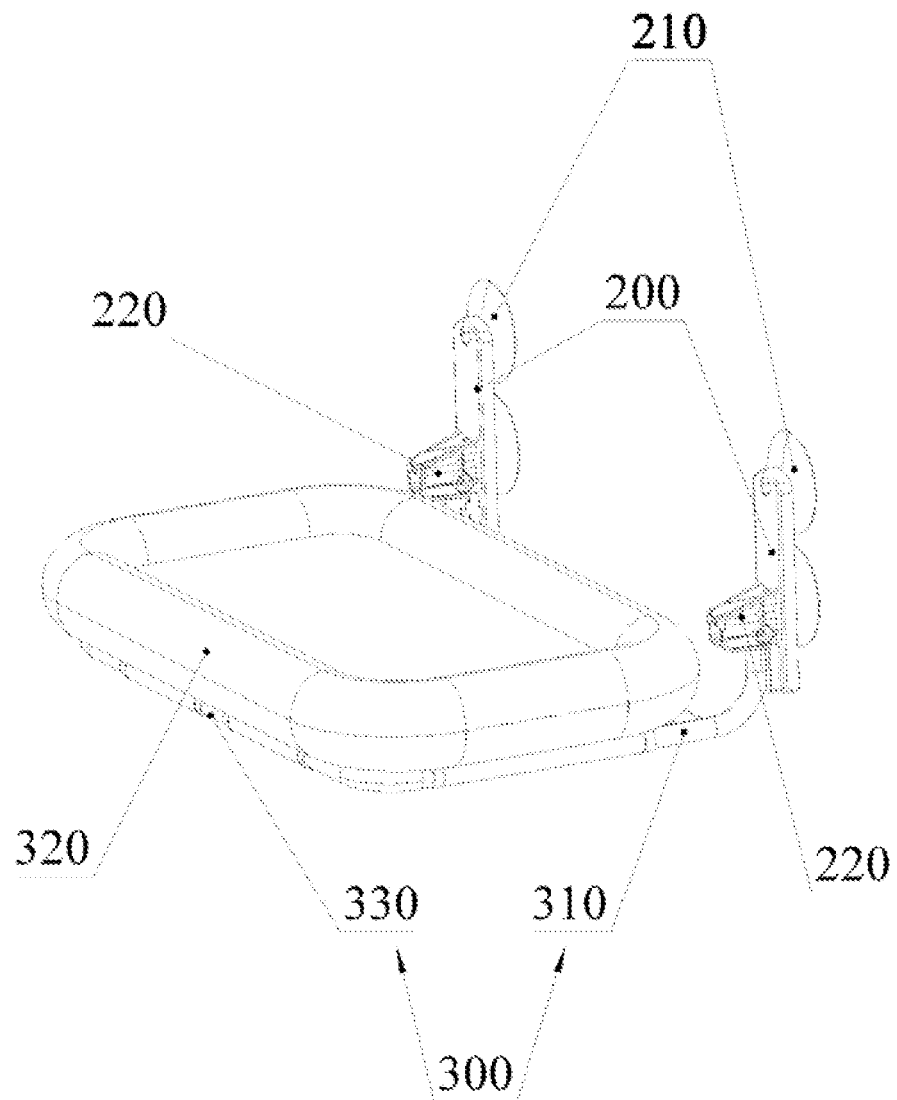
FIG. 1 is a schematic diagram of a foldable suction cup-type pet hammock provided by the present invention.
Figure 2:
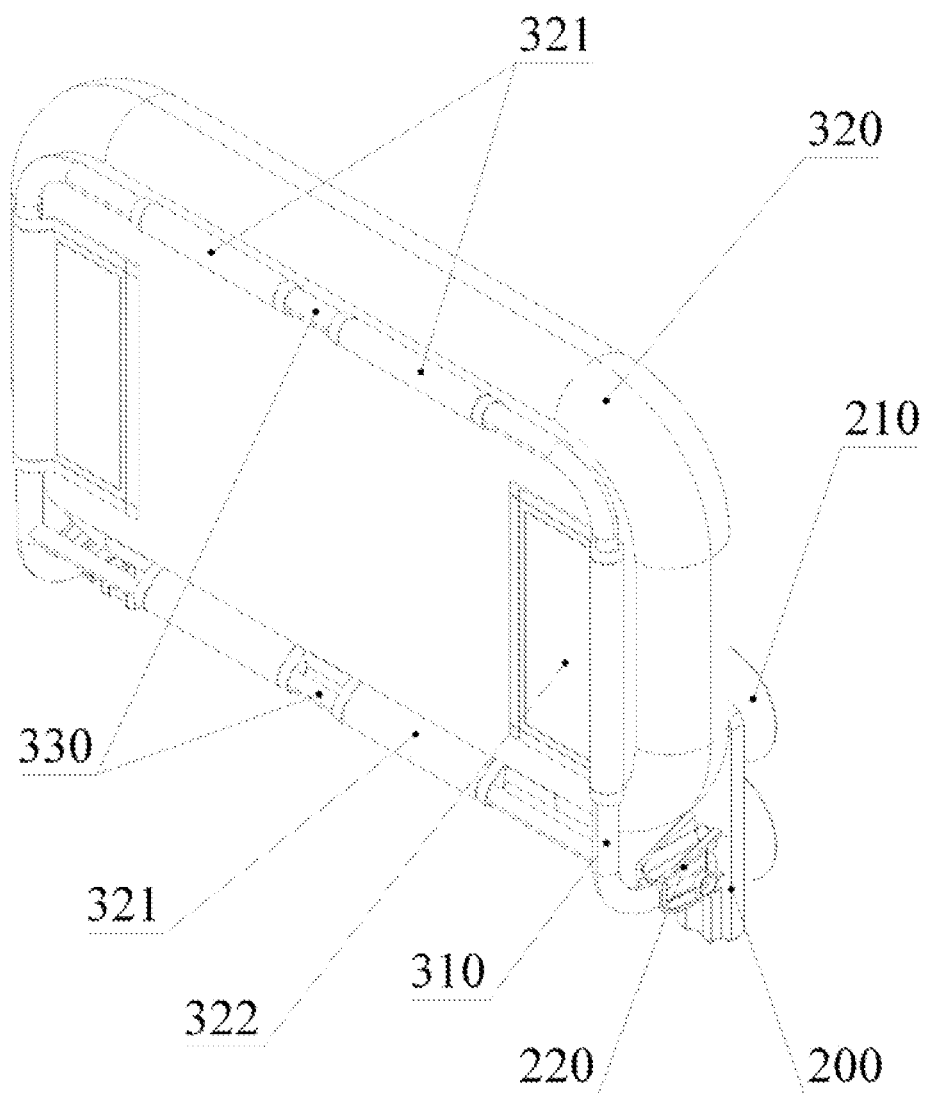
FIG. 2 is a schematic diagram of the folding state of a foldable suction cup-type pet hammock provided by the present invention.
Figure 3:
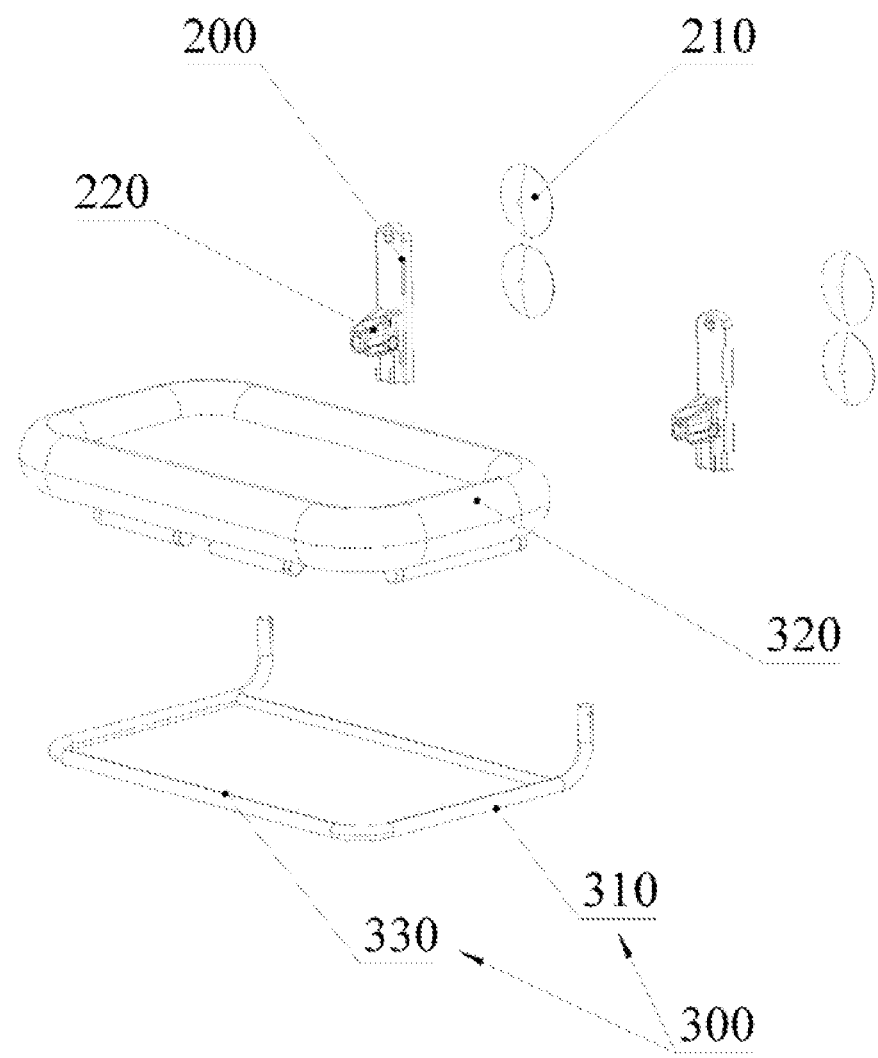
FIG. 3 is an explosion diagram of FIG. 1.

As shown in FIG. 1 to FIG. 3, the present invention provides a foldable suction cup-type pet hammock, which includes at least one fixed component 200 and a bedstead 300, wherein at least one suction cup 210 is arranged on a back of the fixed component 200; the bedstead 300 is rotatably connected with the fixed component 200 and comprises at least one L-shaped pipe 310; the bedstead 300 has a first position and a second position relative to the fixed component 200; the fixed component 200 is provided with a limiting component 220 to keep the bedstead 300 in the first position or the second position; a mattress 320 with a thickness is further arranged on the bedstead, and when the pet hammock is in a folded or unfolded state, the mattress 320 has a relatively flat surface.

As a preferred embodiment of the present invention, the number of fixed components 200 is preferably two, and the bedstead 300 is fixed to the wall or window through the fixed components 200. In this embodiment, the back of each fixed component 200 is also provided with two suction cups 210, which are fixedly connected with the fixed components 200 through threaded holes 201 (see FIG. 5), and the fixed components 200 are adsorbed to the wall or window through the suction cups 210. When the user needs to change the position of the pet hammock, the pet hammock can be removed from the original adsorption position by removing the adsorption force between the suction cup 210 and the wall or window, which is convenient for the user.

In some embodiments, in order to further increase the stability of the pet bedstead relative to the wall or window, the suction cups 210 can be configured in a larger number, and correspondingly, when the pet is lighter, the suction cups 210 can be configured in a smaller number to reduce the use cost of the hammock. In some embodiments, the suction cup 210 can also form a fixed connection with the fixed component 200 by buckles, which further simplifies the installation of the hammock.

Figure 4:
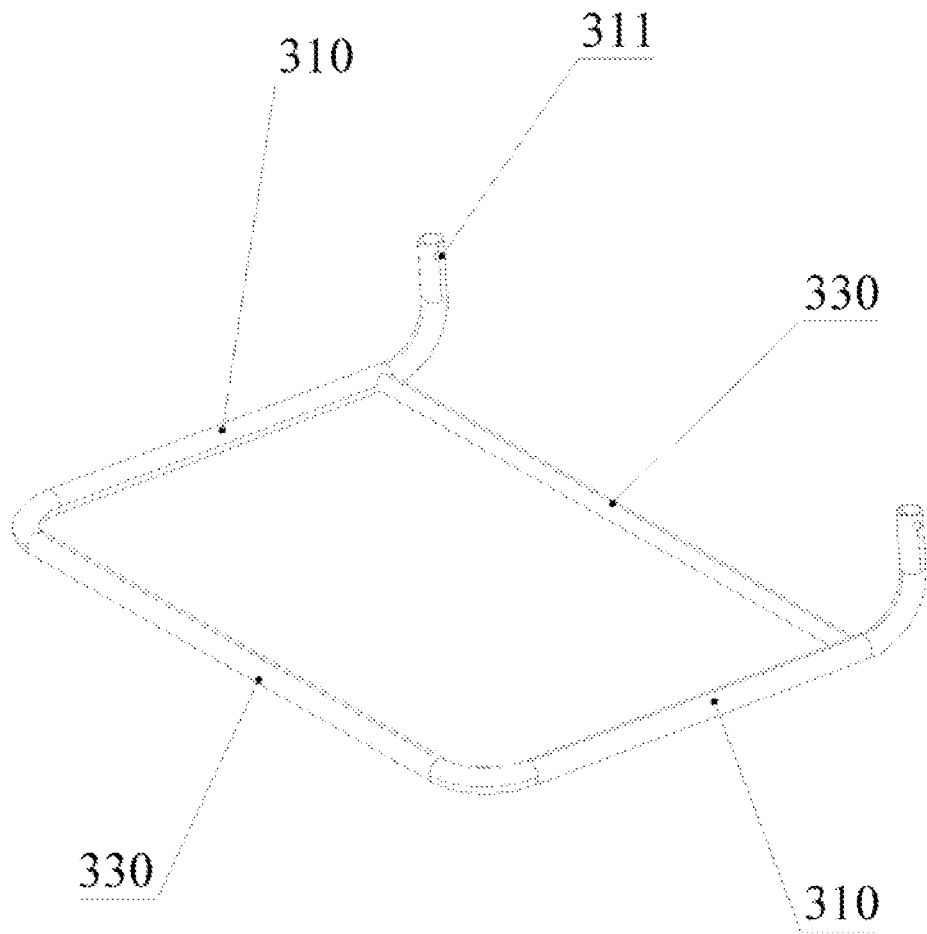
FIG. 4 is a schematic view of the bedstead of the present invention.

As shown in FIG. 4, as a preferred embodiment of the present invention, the bedstead 300 consists of two L-shaped pipes 310 and two connecting pipes 330, which are arranged in parallel with each other and connect the two L-shaped pipes 310 to form a nearly rectangular bed frame structure. In this embodiment, the L-shaped pipes 310 and the connecting pipes 330 are fixedly connected by inserting, which is convenient for storage without reducing their structural strength. In some embodiments, in order to further increase the structural strength of the bedstead 300, the L-shaped pipe 310 can be screwed or integrally molded to further enhance the structural strength. In other embodiments, the two connecting pipes 330 can also have the connection shapes of other paths, so that the frame of the bedstead 300 is more stable.

Figure 5:
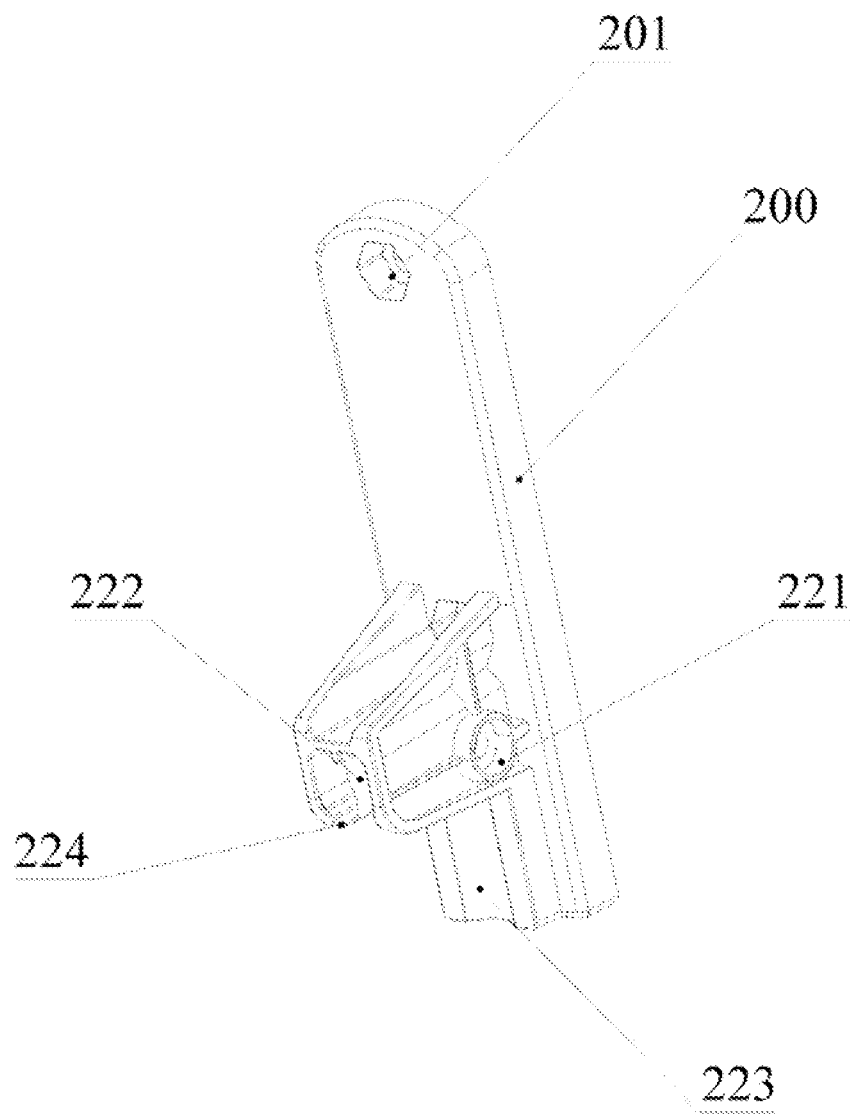
FIG. 5 is a schematic view of the fixed component of the present invention.
Figure 6:
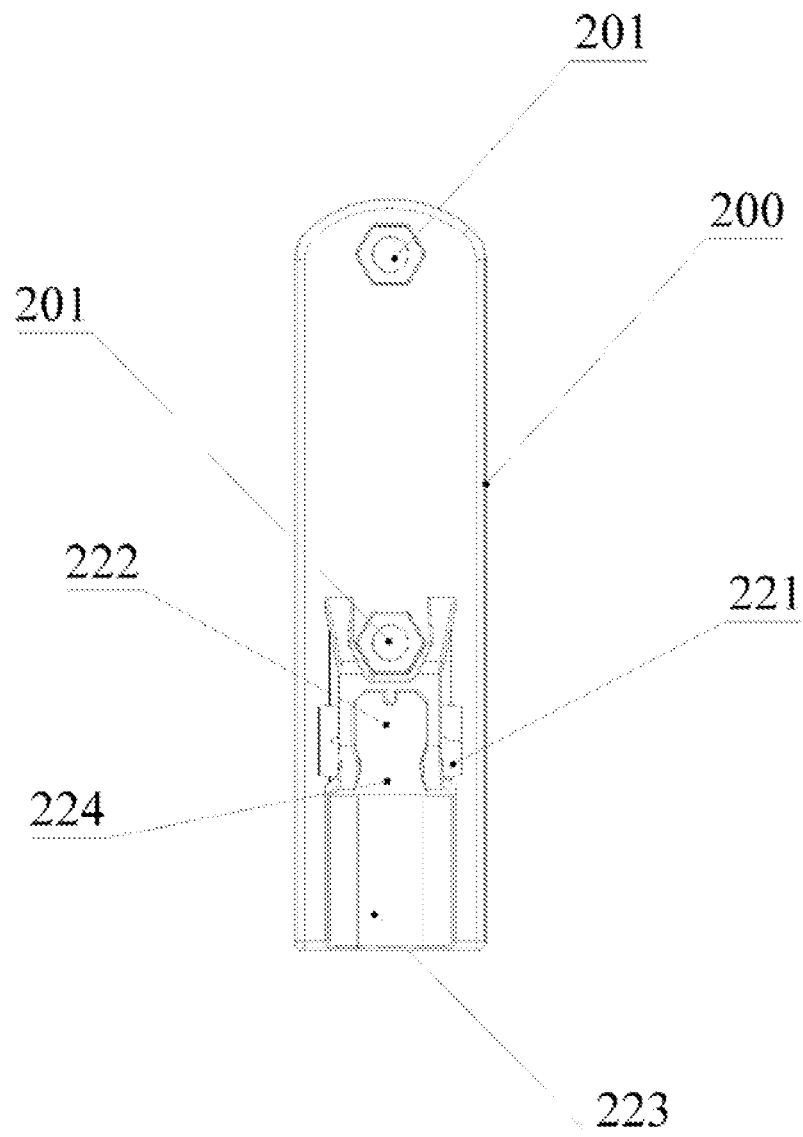
FIG. 6 is a front view of the fixed component of the present invention.

As shown in FIGS. 5 and 6, the fixed component 200 includes a limiting component 220, which is fixedly connected with the fixed component 200. In this embodiment, the limiting component 220 is integrally formed with the fixed component 200, and in some embodiments, the limiting component 220 and the fixed component are fixedly connected with the fixed component 220 by means of screws or buckles.

The limiting component 220 further comprises a hinge part 221, a limiting part 222 and a supporting part 223, wherein one end of the L-shaped pipe 310 is hinged with the hinge part 221 through a hinge hole 311 (see FIG. 4), and the other end is a freely rotatable free end, and the L-shaped pipe is rotatably connected with the fixed component 220 through the hinge part 221, so that the bedstead 300 can freely rotate relative to the fixed component 200.

When the bedstead 300 rotates relative to the fixed component 200, the bedstead 300 has a first position parallel to the fixed component 200 (see FIG. 2) and a second position vertical to the fixed component 200 (see FIG. 1), so that when the bedstead 300 is in the first position, the pet hammock is in a folded state (see FIG. 2), while when the bedstead 300 is in the second position, the pet hammock is in an unfolded state.

In order to keep the pet hammock in the unfolded state and the folded state, as a preferred embodiment of the present invention, the limiting component 220 is further provided with a limiting part 222 and a supporting part 223. When the pet hammock is in the folded state, the L-shaped pipe 310 rotates into the limiting part 222, and in order to restrict the L-shaped pipe 310 in the limiting part 222, the limiting part 222 is provided with a limiting opening 224, the lateral width of which is smaller than that of the L-shaped pipe 310. The limiting opening 224 is made of a plastic material, so that when the L-shaped pipe 310 rotates into the limiting part 222, the rotation can be effectively limited by the limiting opening 224. When the user needs to change the pet bedstead into the unfolded state, the L-shaped pipe 310 can break through the limit of the limiting opening 224 and rotate to the supporting part 223 only by overcoming the material stress of the limiting opening 224. When the L-shaped pipe 310 reaches the supporting part 223, the supporting part 223 forms a support for the L-shaped pipe 310, so that the bedstead 300 is vertical relative to the fixed component 200, and the frame platform of the bedstead 300 is horizontal relative to the ground.

Figure 7:
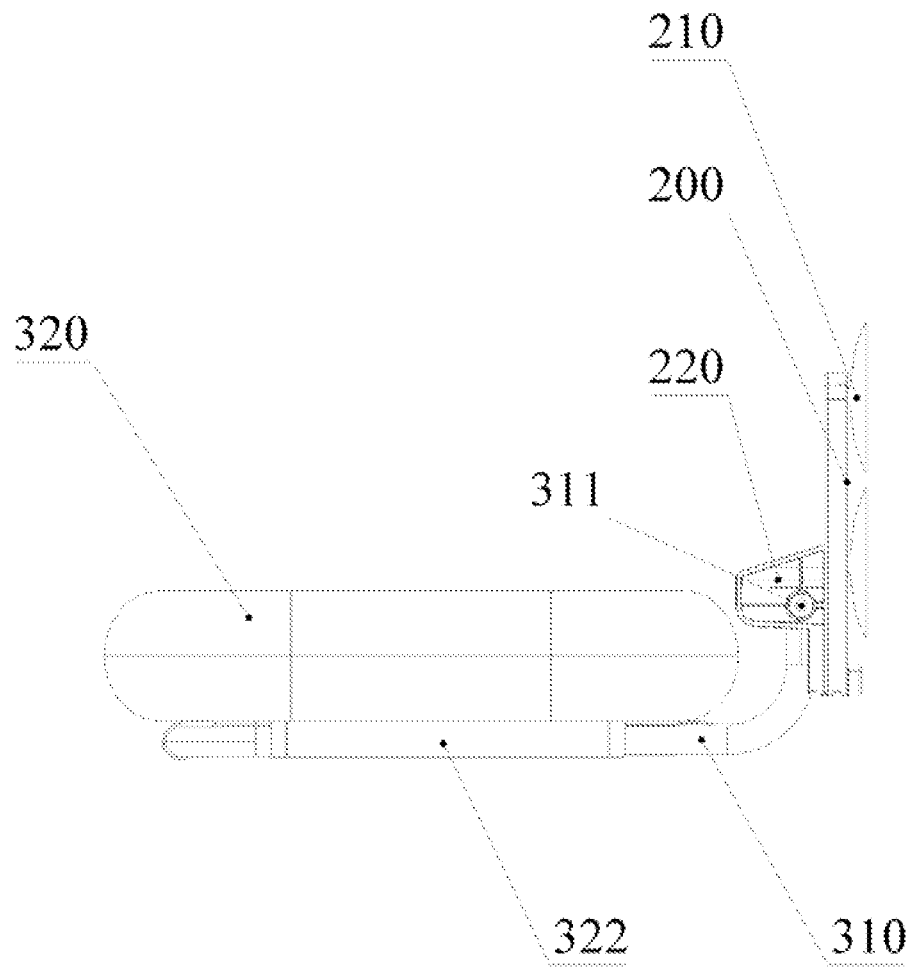
FIG. 7 is a side view of a foldable suction cup-type pet hammock provided by the present invention in an unfolded state.
Figure 8:
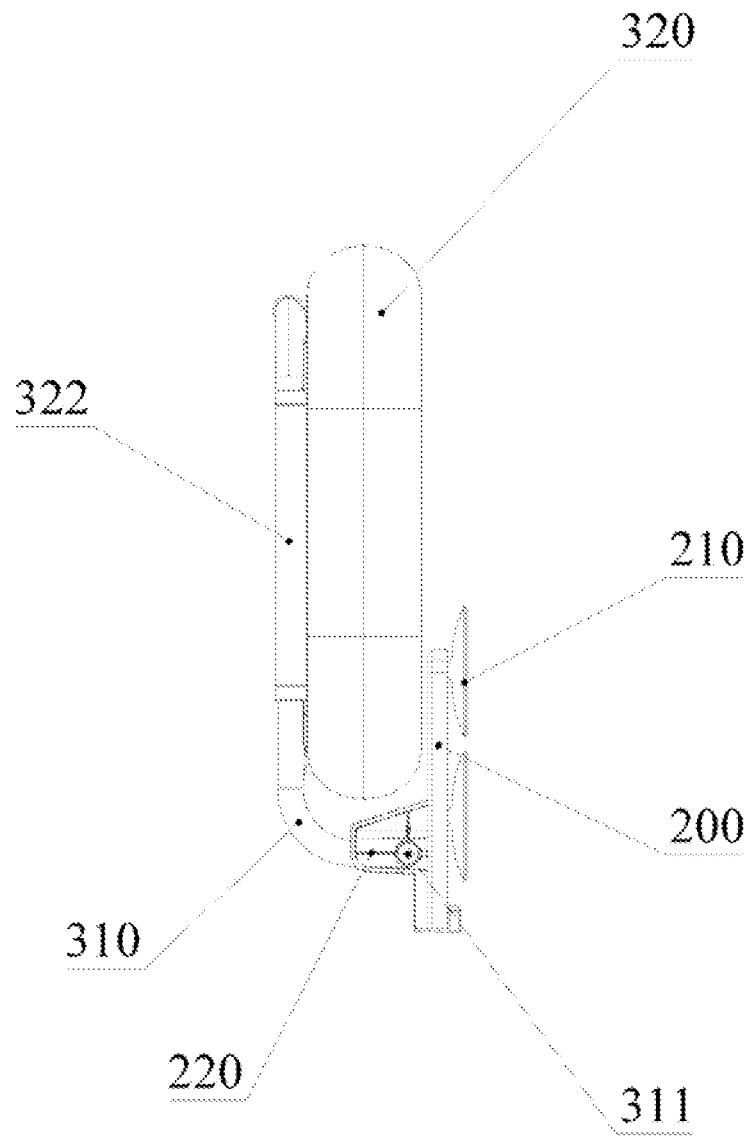
FIG. 8 is a side view of a foldable suction cup-type pet hammock provided by the present invention in a folded state.
Figure 9:
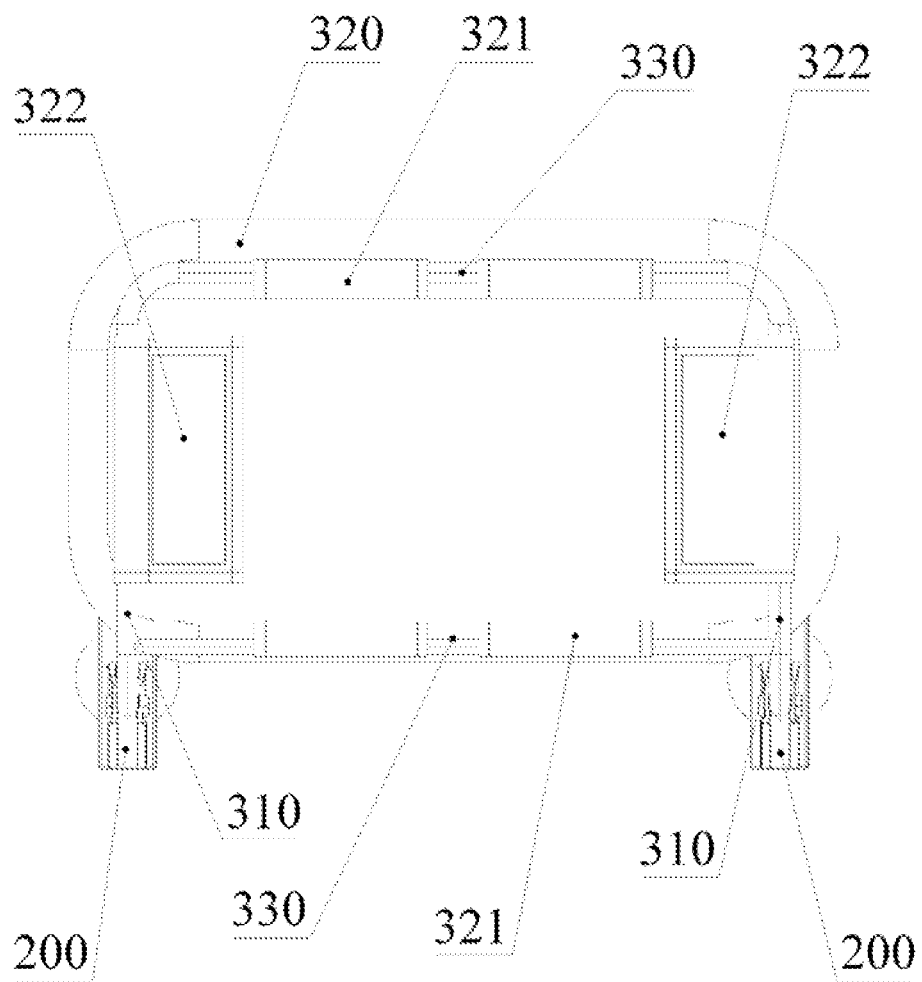
FIG. 9 is a front view of a foldable suction cup-type pet hammock provided by the present invention in a folded state.

As a preferred embodiment of the present invention, in order to give pets better bed comfort and softness, as shown in FIGS. 7, 8 and 9, the mattress 320 is preferably configured as a mattress with a certain thickness and made of flexible materials. In this embodiment, the mattress 320 is arranged on a frame platform composed of L-shaped pipes 310 and connecting pipes 330, and the bottom of the mattress is provided with tubular cloth rings 321 at the front and rear sides for the connecting pipes 330 to pass through. The bottom of the mattress 320 is provided with connecting ears 322 on the left and right sides, and the connecting ears 322 are fixed by hook and loop to facilitate the fixed connection with the L-shaped pipe 310.

In this embodiment, the hinge hole 311 of the L-shaped pipe 310 is arranged at the short side and far away from the bend of the L-shaped pipe 310, so that when the L-shaped pipe 310 rotates, the long side of the L-shaped pipe 310 always keeps a certain distance from the fixed component 200, that is, a space with a certain width is formed between the bedstead 300 and the fixed component 200, and objects in the space will not be squeezed when rotating. Therefore, as a preferred embodiment of the present invention, the space is configured to accommodate the mattress 320, and the mattress 320 has a certain thickness, but the thickness does not exceed the distance between the bedstead 300 and the fixed component 200, so that when the pet hammock of the present invention is in a folded state or an unfolded state, the mattress 320 always has a relatively flat surface, which will not gradually lose its flexibility due to long-term oppression, and the pet can rest on the mattress in a more comfortable posture instead of lying on a layer of cloth.

In some embodiments (not shown in the figure), in order to adapt the pet hammock to different mattresses, a platform is arranged on the bedstead 300, and the mattress 320 is arranged on the platform, and is detachably connected with the platform by means of hook and loop or rope, so as to further meet the user's use requirements.

In other embodiments (not shown in the figure), the present invention can also be configured with a fixed component 200 and an L-shaped pipe 310. In this embodiment, a plurality of connecting pipes 330 are provided to form a relatively stable bed frame.

In other embodiments (not shown in the figure), the fixed component 200 directly forms a fixed connection with the wall or the window, instead of the suction cup 210, so that the pet hammock is more firm and reliable.

In some embodiments (not shown in the figure), the hinge part 221 is provided with a gear ring, and the L-shaped pipe 310 is provided with corresponding clamping teeth, so that the pet hammock has more unfolding angles, and can meet the needs of more pets.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A foldable suction cup-type pet hammock, comprising:
    at least two fixed components (200), and a bedstead (300) and at least one suction cup (210) coupled on a back of each fixed component 200);
    wherein the bedstead (300) is rotatably connected with the fixed components (200), and the bedstead comprises at least two L-shaped pipes (310) and at least two connecting pipes (330) coupled to each other, each of the at least two L-shaped pipes (310) comprise ahinge hole (311);
    wherein the bedstead (300) has a first position and a second position relative to the fixed components (200);
    wherein each fixed component (200) comprises a limiting component (220) to keep the bedstead (300) in the first position or the second position; the limiting component (220) comprises a hinge part (221), a limiting part (222) and a supporting part (223), the end of each of the at least two L-shaped pipes (310) is hinged with the hinge part (221) through the hinge hole (311);
    wherein the at least two L-shaped pipes (310) rotate into the limiting part (222) of the limiting component (220) to align the bedstead in the first position parallel to the fixed component (200), and wherein the at least two L-shaped pipes (310) rotate to the supporting part (223) of the limiting component (220) to align the bedstead in the second position vertical to the fixed components (200); and
    a mattress (320) with a thickness is further arranged on the bedstead, and when the pet hammock is in the first position or the second position, the mattress (320) has a relatively flat surface.

2. The foldable suction cup-type type pet hammock according to claim 1, wherein the at least two connecting pipes (330) are connected with the at least two L-shaped pipes (310) to form a rectangular frame structure.

3. The foldable suction cup-type pet hammock according to claim 1, wherein the limiting part (222) comprises a limiting opening (224).

4. The foldable suction cup-type type pet hammock according to claim 3, wherein a lateral width of the limiting opening (224) is smaller than each of the at least two L-shaped pipes (310), and when the at least two L-shaped pipes (310) are in the first position, the limiting opening (224) keeps the at least two L-shaped pipes (310) in the first position.

5. The foldable suction cup-type type pet hammock according to claim 4, wherein the limiting opening (224) is made of a plastic material.

6. The foldable suction cup-type pet hammock according to claim 5, wherein a bottom of the mattress (320) is provided with tubular cloth rings (321) at the front and rear sides, so as to allow the each of at least two connecting pipes (330) to pass through; a bottom of the mattress (320) is provided with connecting ears (322) at the left and right sides, and the connecting ears (322) are fixed by hook and loop, so as to be fixedly connected with each of the at least two L-shaped pipes (310).

7. The foldable suction cup-type pet hammock according to claim 5, wherein the bedstead (300) is provided with a platform, and the mattress (320) is arranged on the platform to form a detachable connection with the platform.

* * * * *